United States Patent [19]
Demaret

[11] 4,068,812
[45] Jan. 17, 1978

[54] DEVICE FOR MOUNTING CANTILEVER-SUSPENDED BOOMS ON AGRICULTURAL VEHICLES FOR DISTRIBUTING TREATMENT MATERIALS

[76] Inventor: Pierre E. Demaret, 16, Chaus. de Namur, Moignelee, Belgium, B-5690

[21] Appl. No.: 623,011

[22] Filed: Oct. 16, 1975

[51] Int. Cl.² ............................................ F16M 13/00
[52] U.S. Cl. ...................................................... 248/14
[58] Field of Search .......................... 52/645, 664, 690; 248/1, 2, 14, 15, 16, 17, 18, 200, 317

[56] References Cited

U.S. PATENT DOCUMENTS

| | | | |
|---|---|---|---|
| 1,139,158 | 5/1915 | Boerries | 248/18 |
| 2,323,345 | 7/1943 | Moore | 248/1X |

FOREIGN PATENT DOCUMENTS

| | | | |
|---|---|---|---|
| 641,408 | 5/1962 | Canada | 52/645 |

*Primary Examiner*—William H. Schultz
*Attorney, Agent, or Firm*—Holman & Stern

[57] ABSTRACT

A mounting device for distributing booms in which a boom is suspended in laterally-projecting relationship from a vehicle through an anti-roll arrangement comprising an upper, rigid, horizontally-disposed member having depending therefrom and at opposite ends thereof connecting rods pivotally-connected to said longitudinal member and a deflecting bar therebeneath and forming therewith a first trapezoid arrangement, the deflecting bar being parallel to the longitudinal member and in turn having depending therefrom second connecting bars and the top part of a frame and forming therewith a second trapezoid arrangement, the frame having projecting from opposite ends thereof cantilever-supported boom members so that movement of the vehicle over irregular surfaces or angular slopes results in minimal flipping movement and/or oscillation of the boom.

5 Claims, 3 Drawing Figures

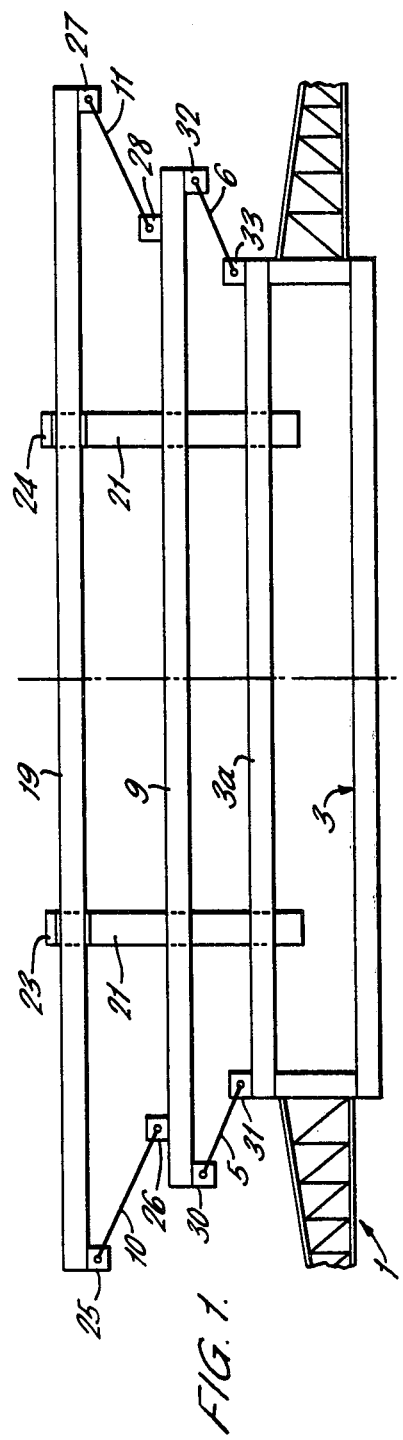
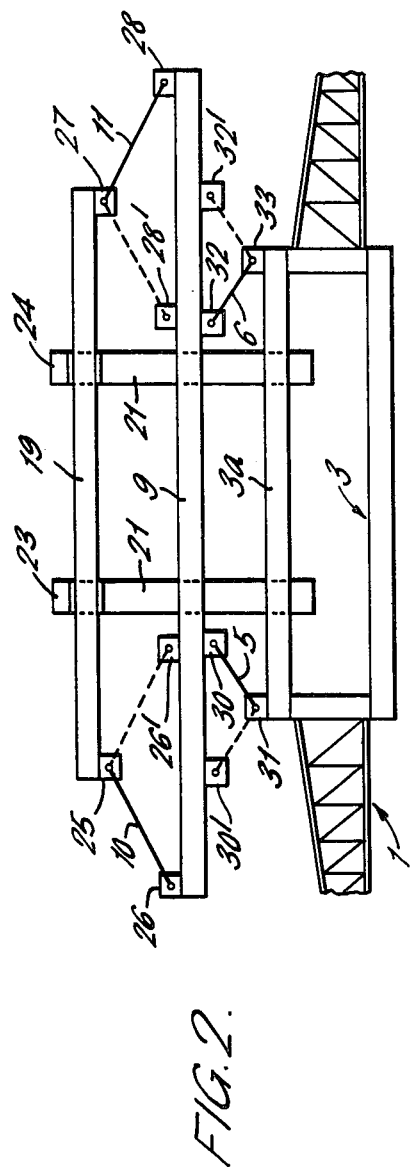

DEVICE FOR MOUNTING CANTILEVER-SUSPENDED BOOMS ON AGRICULTURAL VEHICLES FOR DISTRIBUTING TREATMENT MATERIALS

FIELD OF THE INVENTION

The present invention relates to an improved mounting device for booms distributing materials for agricultural use.

BACKGROUND OF THE INVENTION

In agriculture, wide use is made of distribution devices mounted on booms for various uses. Spraying booms are in particular used for various pesticide or phytopharmaceutical products. Use may also be made of booms for distributing liquids without spraying them; thus, it is possible to distribute liquid fertilizers, particularly fertilisers in solution form, with the aid of booms. Booms may in addition be used for distributing solid materials, such as seeds, and in particular pulverulent materials, such as solid fertilizers.

These distribution booms are mounted on towed or self-propelled vehicles, which have to move over fields whose surface is irregular and which may also contain slopes or may themselves be hillsides. As the result of the irregularities of the ground in relation to the wheels of the vehicles moving thereon (clods, stones, tyre marks, furrows, etc.), there is generally a disordered movement of the free ends of the boom, which is fixed to the carrier vehicle only at its centre. This movement, the amplitude of which may be very considerable in the case of long booms, is the cause of considerable irregularities in the distribution of the materials.

It should be noted that this irregular movement may be split up into a whipping movement in a horizontal plane and a rolling movement in the vertical plane perpendicular to the direction of advance. In addition to its effect on the irregularity of distribution of the materials, the rolling may be so considerable that the boom touches the ground, so that it may be damaged.

Various devices are known for reducing the rolling effect of the booms, mentioned above, and attention in particular is drawn to French Pat. No. 1,564,543 (Evrard), Belgian Pat. No. 795,007 (De Meeus), U.S. Pat. No. 3,680,505 (Loeffler), and German Patent Application DT-OS No. 2,160,227 (Maass).

Devices disclosed by the prior art mentioned above essentially propose to suspend the boom with the aid of two connecting rods. However, these disclosures are only partly successful, in the sense that in the case of considerable irregularity of the ground, the rolling of the boom is not completely limited, and in particular, a boom of long span may actually touch the ground under the jotting action. Furthermore, the prior art is effective only for substantially horizontal ground, that is to say, ground where, with the exception of localised irregularities of the surface, the axle of the vehicle carrying the boom moves in a substantially horizontal plane. If the machine is intended for hillside working, no simple mechanical solution has been proposed for keeping the boom parallel to the slope of the ground. Hydraulic control is of course possible, but is expensive and difficult to operate. The longer the boom, the greater these difficulties will become.

SUMMARY AND OBJECTS OF THE INVENTION

The present invention seeks to provide an improved mounting device for booms of this kind, which permits better compensation for shocks caused by jolting or by the fact that the vehicle slopes on one side when one of the wheels passes over an irregularity in the ground, and which, with the aid of a particular adaptation, permits mechanical compensation for substantial slopes of the ground.

In order to achieve this aim, the device according to the invention is characterised in that the boom is suspended on the carrier vehicle with the aid of an anti-roll mechanism formed by two primary connecting rods disposed in a substantially vertical plane and mounted at their upper end on a deflecting bar, which in turn is suspended by two secondary connecting rods disposed in a substantially vertical plane and mounted at their upper end on the carrier vehicle.

It is advantageous for the connecting rods to be disposed in the vertical plane in a configuration corresponding to two articulated trapezoidal frames connected by a common base, the connecting rods forming the non-parallel sides of each trapezoidal frame and the common base being composed of a deflecting bar.

The two trapezoidal frames may be disposed in various ways, and two particular arrangements have been found advantageous.

In a first preferred embodiment of the invention, the two connecting rods forming the two non-parallel sides of each trapezoid, when the boom is suspended on the carrier vehicle, converge in the downward direction. An arrangement of this kind provides a good roll stabilizing effect and in addition is equally well suited for keeping the boom parallel to the axle of the vehicle carrying it, whatever the slope of the land on which the vehicle is moving.

In a second preferred embodiment of the invention, which is in particular suitable for providing a very effective anti-roll action on substantially horizontal ground, the connecting rods forming the two non-parallel sides of each trapezoid converge in the upward direction when the boom is suspended on the carrier vehicle.

A device which is particularly interesting from the practical point of view is one in which adaptation is possible to convert the device so as to obtain either the first or the second embodiment.

The invention will be described in greater detail with reference to practical embodiments, which are given as examples. The drawings are diagrammatical representations to scale.

DESCRIPTION OF THE FIGURES OF THE DRAWING

FIG. 1 is a rear view of a suspension device for a boom (broken away) elevational, the boom being particularly adapted for hillside working;

FIG. 2 is a rear elevational view of a suspension device similar to FIG. 1, mounted for working on substantially horizontal ground but permitting conversion to hillside working.

DESCRIPTION OF PREFERRED EMBODIMENTS

Figure 3:
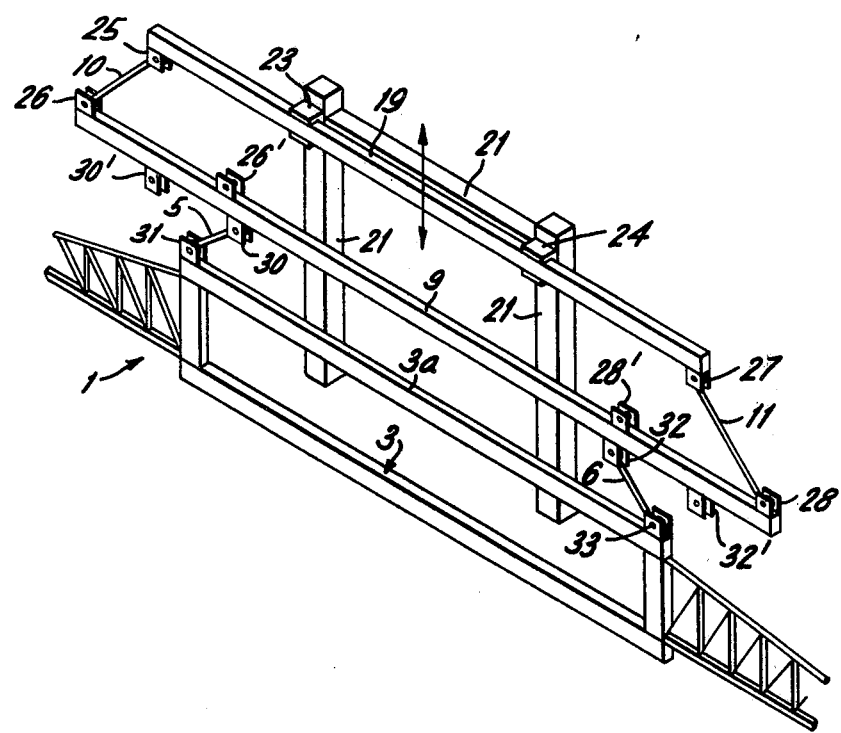
FIG. 3 is a perspective view of the boom and a suspension device therefor.

Identical reference numerals have been used in both Figures to designate identical or similar component elements, and the invention will first be described in a general manner with reference to the component elements common to both Figures.

In the drawings, a spraying boom is partially shown at 1 and the suspension device comprises a frame 3 which is suspended at its top part 3a from two primary connecting rods 5 and 6. The top ends of the connecting rods are fixed in such a manner as to be able to pivot on a longitudinal member 9 which forms a deflecting bar and which is in turn suspended from secondary connecting rods 10 and 11. A longitudinal member 19 supports the connecting rods 10 and 11 and is in turn rigidly fastened in fixed relation to frame members 21 brackets 23 and 24 make the connection between the frame 21 and the longitudinal mamber 19, holding the device supporting the boom in a vertical plane at a distance from the vertical plane of the members 21 in order to provide the fullest freedom of swinging of the boom 1 and longitudinal member 9 without rubbing against the frame 21.

The connecting rods 5, 6, 10, and 11 are connected to the elements 3a, 9, and 19, respectively, at attachment points 25, 26, 27, 28 and 30, 31, 32, 33, on which the connecting rods can pivot freely. These connecting rods are preferably rigid elements, but could comprise cables or chains tensioned by the weight of the boom.

It will be noted that the elements 9, 10, 19, 11, on the one hand, and 3a, 5, 9 and 6 form two trapezoids connected by a common base 9.

In the embodiment illustrated in FIG. 1, the connecting rods 10 and 11 and also 5 and 6 constituting the non-parallel sides of the trapezoids converge downwardly and the device is suitable for sloping ground, whereas these same connecting rods converge upwardly in FIG. 2 and are particularly suitable for horizontal ground.

In the embodiment shown in FIG. 2, attachment points 26', 28', 30', and 32' are provided which make it possible to modify the fastening of the connecting rods by changing from the position shown in solid lines to that shown in broken lines. Provision may be made for the attachment points 26, 28, 30, and 32 to be mounted in such a manner as to be able to be displaced on a slide parallel to the longitudinal member 9, while the movement can be controlled by any suitable means, such as a worm or a hydraulic drive.

The geometry of the trapezoids depends essentially on the type of ground on which the vehicle carrying the boom moves, and also on the weight and length of the boom.

The drawings illustrate the configurations which have been found interesting. The angle of inclination of the connecting rods in relation to the horizontal may vary between 5 and 60°, and preferably between 20° and 27° in order to obtain the best results.

Arrangements may be provided to make it possible to simply modify the shape of the trapezoidal frames, for example, by modifying the length of the connecting rods or, as described above, their attachment points. In the usual manner, a drive device enabling the frame 21 to be raised may be provided. It is also possible to provide controlled, damped movement of this frame in relation to the carrier vehicle in other planes.

I claim:

1. A mounting device for booms suspended from a vehicle and used for distributing agricultural-treatment materials or the like, said mounting device comprising, in combination:
    an anti-roll mechanism including a rigid, horizontal deflecting bar;
    primary connecting rods suspended angularly in a vertical plane from opposite ends of said deflecting bar;
    an upper, rigid, horizontally-disposed longitudinal member parallel to said deflecting bar and including means for connection to a vehicle;
    second connecting rods depending angularly in a vertical plane from opposite ends of said upper longitudinal member, said connecting rods being freely pivoted to their respective deflecting bar and longitudinal members, and a boom-frame pivotally-connected to the first-mentioned, primary connecting rods and having a boom projecting outwardly beyond said primary connecting rods.

2. A device according to claim 1, characterized in that the connecting rods are disposed in a vertical plane in a configuration corresponding to two articulated trapezoidal frames connected by a common base, the connecting rods forming the non-parallel sides of each trapezoidal frame and the common base being constituated by the deflecting bar.

3. A device according to claim 2, characterized in that the two connecting rods forming the two non-parallel sides of each trapezoidal frame converge in the downward direction when the boom is suspended on the carrier vehicle.

4. A device according to claim 2, characterized in that the connecting rods forming the two non-parallel sides of each trapezoidal frame converge in the upward direction when the boom is suspended on the carrier vehicle.

5. A device as claimed in claim 2, in which said connecting rods are detachably-connected between the respective deflecting bar and longitudinal member for converting the connecting rods in non-parallel divergent or convergent relationship between the boom-frame and deflecting bar, and the deflecting bar and longitudinal member, respectively.

* * * * *